Dec. 18, 1951    R. L. HALL    2,578,929
PIE AND CAKE PAN
Filed Jan. 16, 1950    2 SHEETS—SHEET 1
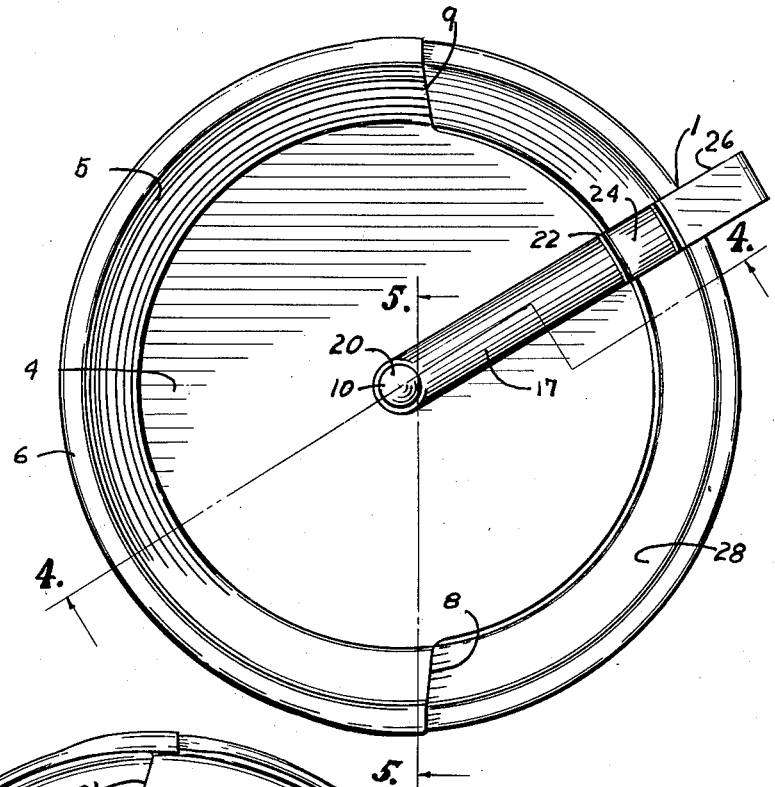
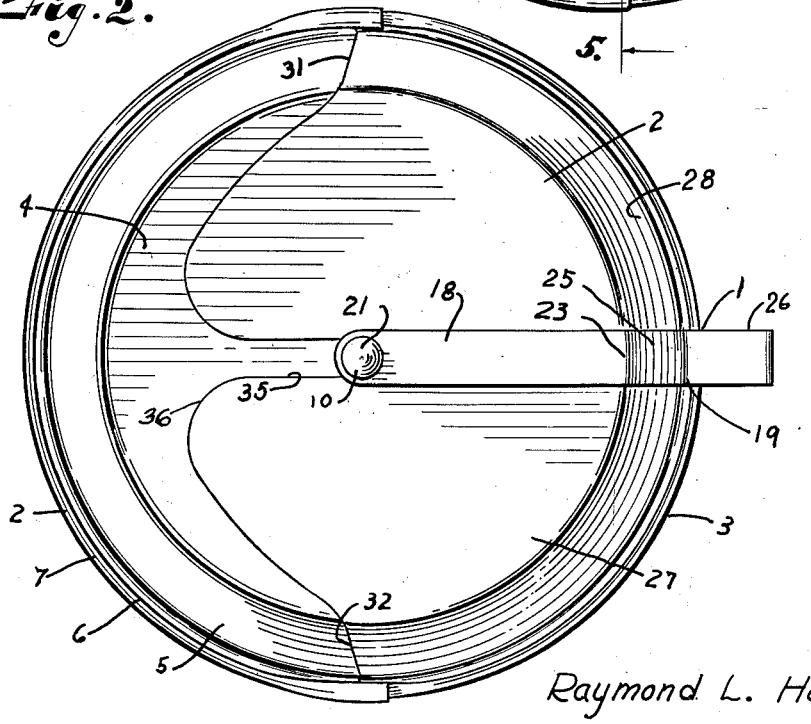
Inventor
Raymond L. Hall
By
Fishburn & Mullendore
Attorneys Dec. 18, 1951 R. L. HALL 2,578,929
PIE AND CAKE PAN
Filed Jan. 16, 1950 2 SHEETS—SHEET 2
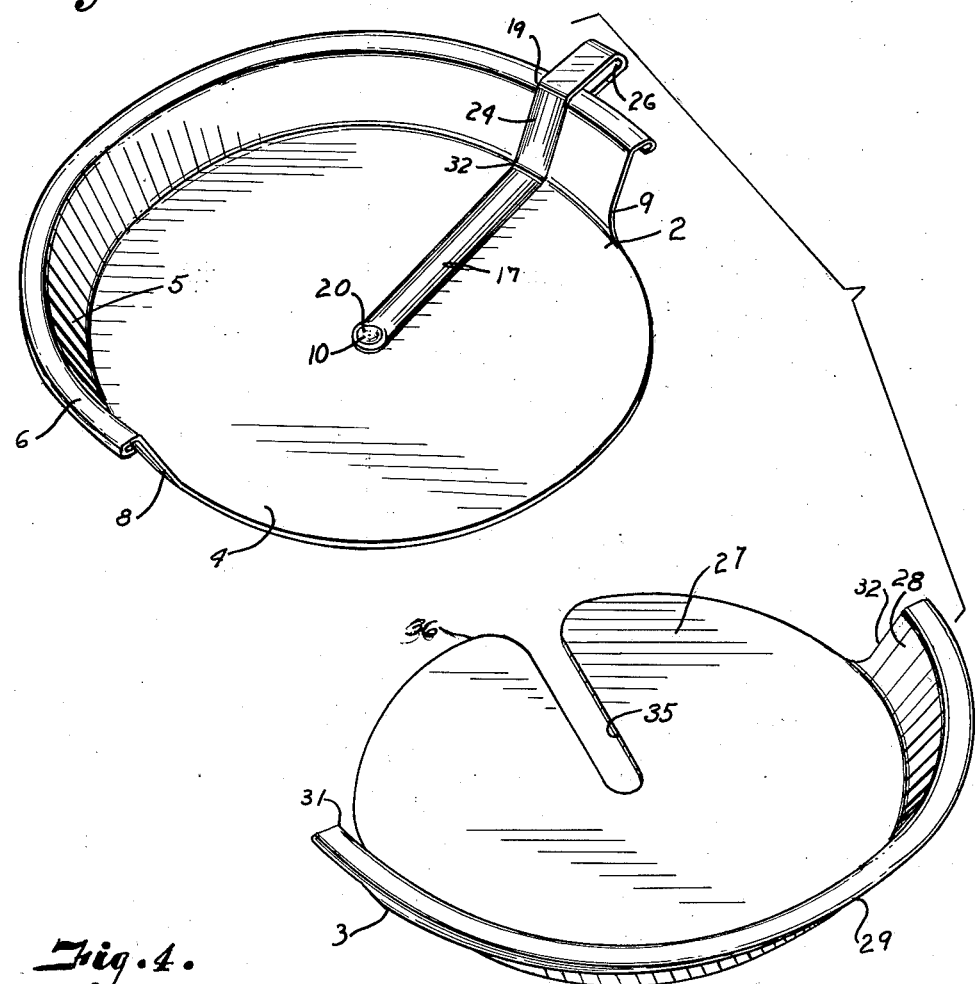
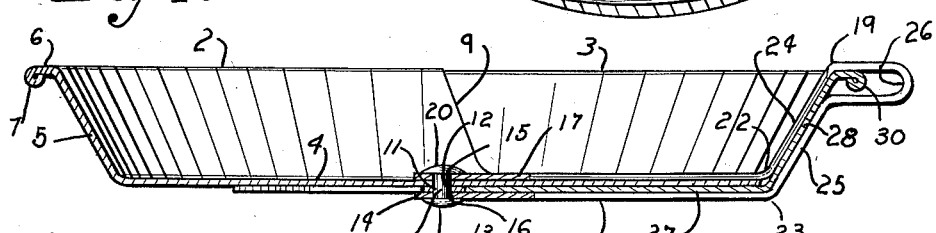
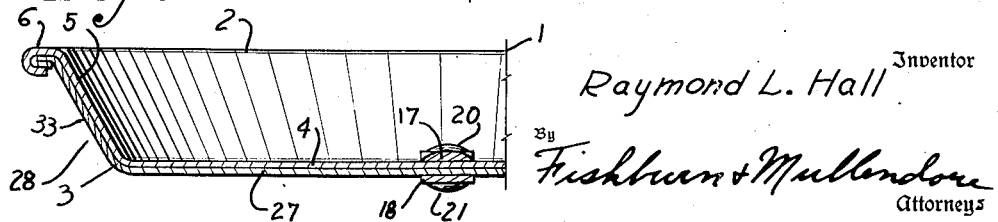
Raymond L. Hall, Inventor
By Fishburn & Mullendore, Attorneys Patented Dec. 18, 1951

2,578,929

UNITED STATES PATENT OFFICE 2,578,929

PIE AND CAKE PAN

Raymond L. Hall, Kansas City, Mo.

Application January 16, 1950, Serial No. 138,768

3 Claims. (Cl. 99—429)

This invention relates to baking pans for pies, cakes and the like, and more particularly to pie and cake pans formed in sections, whereby the sections when placed together will form a complete pan, these sections being separable so as to permit the ready removal of an article after it has been baked.

The objects of the invention are to provide pie and cake pans formed of sections, which, when placed together, provide a pan in which an article may be baked in the conventional manner and after baking separation of the sections permits removal of an article, such as a pie, from the pan without breaking of the crust thereof; to provide a pan of this character in which one of the sections has a complete bottom for supporting the bottom of a baked article when the other section is removed therefrom; to provide a knife structure secured to one section of the pan for rotation about an axis extending through the center of said pan and having portions engageable with the other section for retaining the sections in assembled condition; to provide a separable pie pan so constructed with overlapping meeting portions for aiding in retaining the sections together to form a complete pan and peripheral wall therefor; and to provide a pan of this character which is economical to manufacture, readily assembled and disassembled, efficient in use and easily cleaned.

In accomplishing these and other objects of the present invention, I have provided improved details of structure, the preferred forms of which are illustrated in the accompanying drawings, wherein:

Fig. 1 is a plan view of a pan embodying the present invention, showing the sections in assembled condition.

Fig. 2 is a bottom view of the pan with the sections in assembled condition with the knife element in position to retain the sections together.

Fig. 3 is a disassembled perspective view of the pan sections with the knife element rotated to a position for separation of said sections.

Fig. 4 is a detailed sectional view through the pan on the line 4—4, Fig. 1.

Fig. 5 is a partial detailed sectional view through the pan on the line 5—5, Fig. 1.

Referring more in detail to the drawings:

1 designates a pie and cake pan of circular form comprising sections 2 and 3. Section 2 has a circular bottom 4 provided with an upwardly inclined side wall 5 which terminates in an outwardly directed flange 6 preferably substantially parallel to the bottom 4. The edge of the flange is turned downwardly and rolled as at 7 or otherwise shaped to form a smooth periphery for the flange. The wall 5 and flange 6 are cut as at 8 and 9, said wall and flange extending peripherally of the bottom somewhat more than a half circle whereby the end edges of the wall substantially define a plane which is spaced toward the open side of the pan section from the axial center thereof as shown in Figs. 1 and 2.

A pivot member 10 is located at the axial center of the bottom 4 of the pan section 2, which pivot member preferably consists of a rivet or other pivotal device having a shank 11 extending through an aperture 12 in the bottom 4 and an aperture 13 of a washer 14 engaging the bottom surface of said bottom. The shank 11 also extends through apertures 15 and 16 in the terminal ends of upper and lower arms 17 and 18 of the knife member 19, said arms being parallel to the bottom 4 and to each other. The rivet is provided with heads 20 and 21 respectively engaging the upper face of the arm 17 and lower face of the arm 18 to retain the knife in assembled relation with the section 2 and also to permit rotary movement of said knife member around the pivot member 19. The knife member is preferably formed of a single strip of metal whereby the arms 17 and 18 are bent as at 22 and 23 to form upwardly and outwardly sloping portions 24 and 25 adapted to resiliently engage the side walls of the sections, said upwardly and outwardly extending portions being connected by a U-shaped portion 26 which forms a handle for the knife member and also provides clearance for the flanges of the pan sections.

The pan section 3 is provided with a bottom 27 adapted to underlie the bottom 4 of the section 2. Integral with the bottom 27 and peripherally thereof is an upwardly inclined side wall 28 which terminates in an outwardly directed flange 29 having the edge turned under and rolled or otherwise suitably finished as at 30. The side wall 28 and flange 29 are cut as at 31 and 32 whereby said side wall extends somewhat more than a half circle and the end portions of the side wall 28 underlie the end portions of the side wall 5 when the sections are positioned as shown in Figs. 1 and 2. Downturned edges of the flange 29 adjacent the cut ends thereof are flattened, as at 33, against the lower side of the flange 29 and the edges of the flanges 6 adjacent the cut ends thereof are turned downwardly and spaced from the flange 6 to form recesses into which the end portions of the flange 29 extend when the sections are placed together as shown in Figs. 1 and 2, whereby the interengagement of the flanges and ends thereof tends to hold the pan sections against lateral displacement.

The bottom 27 is provided with a radial slot 35 extending from the edge of the bottom 27 at substantially equal distances from the ends of the side wall 28 inwardly and beyond the axial center of the pan. The outer ends of the bottom 27 adjacent the slot 35 are preferably rounded as at 36, facilitating entry of the bottom 27 between the blade arm 18 and the bottom 4 whereby the bottom 27 may be moved under the bottom 4 and the washer 14 enter into the slot 35 to permit the pan sections to interengage with the bottom 4 overlying the bottom 27, the end portions of the side wall 5 overlying the end portions of the side wall 28 and the end portions of the flange 6 and its edges being sleeved over the end portions of the flange 29 whereby the sections are interengaged as shown in Figs. 1 and 2.

The relative radii of the bottom portions of the sections 2 and 3 are substantially the same whereby the free edge of the bottom 4 lies adjacent the connection of the side wall 28 with the bottom 27, as shown in Fig. 2, and said sections cooperate to form a pan of substantially circular form. The washer 14 is preferably substantially the same thickness as the bottom 27 whereby the pivotal mounting of the knife member on the section 2 and the engagement of said knife member with the bottoms 4 and 27 and the side wall 28 prevent section 3 from being drawn from section 2 and thereby retain the respective sections in assembled condition for baking of pies, cakes and the like. The side portions of the arm 17 and upwardly extending portion 24 of the blade member 19 are preferably bevelled to form relatively sharp edges whereby on rotation of said blade member said portions of the blade serve to separate baked articles from the bottom and sides of the pan.

In using a pan constructed as described, the sections are arranged and assembled in closed condition as shown in Figs. 1 and 2 for receiving the raw material of an article to be baked. After baking the U-shaped portion 26 and knife member 19 is grasped and rotated about the pivot member 10 for a complete circle, the sharpened edges of the blade portions 17 and 24 serving to separate the baked article from the bottom and side walls of the pan 6. The knife member is then moved until the U-shaped portion extends around only the flange 6 of the pan 2 and particularly the portion where the flange edge is rolled, for example as shown in Fig. 3. This releases section 3 from the section 2 whereby said sections may be pulled away from each other. This separation of the pan sections is preferably such that during the pulling of the sections apart the respective bottoms remain parallel and the direction of movement is defined by the slot 35. This separation of the pan sections leaves the baked article on section 2 supported by the bottom 4, but the open side of said section allows the baked article to be slid through the said open side onto a plate or the like without damage to the crust of a pie or other baked article.

It is believed obvious that I have provided a simple, efficient sectional pie and cake pan wherein the sections may be separated for facilitating removal of the baked articles therefrom.

What I claim and desire to secure by Letters Patent is:

1. A pan of the character described comprising, a pair of separable pan sections, one of said sections having a circular bottom, the other of said sections having a bottom adapted to underlie the circular bottom and having a radial slot therein, side walls integral with the respective bottoms, said side walls having edges in overlapping relation, a pivot located centrally of said circular bottom and extending through the slot in the other bottom, and a blade member having inner ends engaged with said pivot for rotary movement thereabout, said blade member having a portion engaging the wall of the section having the slotted bottom for retaining same in complementary position relative to the section having the circular bottom.

2. A pan of the character described comprising, a pair of separable pan sections, each of said sections having integral bottoms and side walls, the side walls of each pan section extending around more than half of the periphery of the respective pan sections whereby said sections have their meeting edges in continuously overlapping relation, a pivot located centrally of the bottom of one section, and a blade member having one arm extending above and in contact with the bottom of said one section and another arm extending below and in contact with the bottom of the other section with each of the inner ends of said arms engaged with said pivot for rotary movement thereabout, said blade member having a portion engaging the side wall on said other section to secure the sections in complementary assembled position.

3. A pan of the character described comprising, a pair of separable pan sections, each of said sections having integral bottoms and side walls, the side walls of each pan section extending around more than half of the periphery of the respective pan sections whereby said sections have their meeting edges in continuously overlapping relation, one of said sections having a circular bottom, the other of said sections having a bottom adapted to underlie the circular bottom and having a radial slot extending from the open side of the bottom thereof, a pivot located centrally of the other bottom and extending through the slot, and a blade member having one arm extending above and in contact with the upper face of the circular bottom and another arm extending below and in contact with the lower face of said other bottom, each of said arms having inner ends engaged with said pivot for rotary movement thereabout, said blade member having a portion engaging the wall of the section having the slotted bottom for retaining same in complementary assembled position relative to the section having the circular bottom.

RAYMOND L. HALL.

REFERENCES CITED

The following references are of record in the file of this patent:

UNITED STATES PATENTS

| Number | Name | Date |
| --- | --- | --- |
| 161,890 | Manning | Apr. 13, 1875 |
| 1,757,655 | Dillow | May 6, 1930 |
| 2,202,512 | Archer | May 28, 1940 |
| 2,297,914 | Pino | Oct. 6, 1942 |